United States Patent [19]

Beever

[11] Patent Number: 5,677,946
[45] Date of Patent: Oct. 14, 1997

[54] ADAPTER FOR CONNECTING A MODEM TO A DIGITAL PRIVATE BRANCH EXCHANGE

[75] Inventor: Ernest A. Beever, Plano, Tex.

[73] Assignee: MCI Corporation, Washington, D.C.

[21] Appl. No.: 514,899

[22] Filed: Aug. 14, 1995

[51] Int. Cl.[6] .................................................. H04M 11/00
[52] U.S. Cl. ........................... 379/93; 379/94; 379/98; 379/100
[58] Field of Search ........................ 379/94, 98, 96, 379/100, 93, 441, 442, 447

[56] References Cited

U.S. PATENT DOCUMENTS

| | | |
|---|---|---|
| 4,346,259 | 8/1982 | Doty . |
| 4,436,351 | 3/1984 | Chiarottino . |
| 4,642,805 | 2/1987 | Dumas et al. . |
| 5,033,062 | 7/1991 | Morrow et al. . |
| 5,127,041 | 6/1992 | O'Sullivan . |
| 5,249,218 | 9/1993 | Sainton . |
| 5,317,630 | 5/1994 | Feinberg et al. ............. 379/94 |
| 5,319,700 | 6/1994 | Mano et al. ................. 379/94 |
| 5,341,418 | 8/1994 | Yoshida . |
| 5,349,640 | 9/1994 | Dunn et al. . |
| 5,367,563 | 11/1994 | Sainton . |
| 5,386,438 | 1/1995 | England . |
| 5,481,598 | 1/1996 | Bergler et al. .............. 379/94 |

*Primary Examiner*—Stella Woo

[57] ABSTRACT

A device for connecting a data device having an analog output to a digital telephone having a base unit and a handset with first analog signals being coupled bi-directionally between the base unit and the handset. The device includes a first input receiving the first analog signals from the base unit, a second input receiving the first analog signals from the handset, a third input receiving a second analog signal from the analog output of the data device, and a switch coupled to the first, second and third inputs for selectively bi-directionally coupling the second analog signal to the base unit and the first analog signals bi-directionally between the base unit and the handset.

4 Claims, 2 Drawing Sheets

ADAPTER FOR CONNECTING A MODEM TO A DIGITAL PRIVATE BRANCH EXCHANGE

BACKGROUND OF THE INVENTION

1. Field of the Invention

The present invention is directed to an adapter for connecting a device having an analog output signal to a private branch exchange (PBX). More particularly, the present invention is directed to an adapter for connecting a device having an analog output signal, such as a modem or a facsmilie machine, to a digital PBX.

2. Description of the Related Art

Existing digital PBX systems allow for modem communication between a computer, such as a personal computer (PC), and a remote modem by accepting digital data from the PC and converting it in a PBX modem bank into a standard analog modem signal for transmission to the remote modem. Analog modem signals received from the remote modem are converted to a digital signal by the modem bank for subsequent processing by the PC.

FIG. 1 shows a schematic block diagram of a conventional digital PBX, system, such as a Rolm digital PBX for example. PBX system 10 includes a plurality of voice paths and a modem pool having a plurality of modems, of which only one voice path 11 and one modem 12 are shown. A plurality of digital telephones are connected to PBX 10, of which only one digital telephone 13 is shown. An exemplary digital telephone is disclosed by U.S. Pat. No. 5,349,640 to Dunn et al., which is incorporated by reference herein.

Digital telephone 13 includes a base unit 14 and a handset 15. Analog voice signals are coupled between base unit 14 and handset 15 through cord 16. Digital telephone 13 also includes a coder/decoder (CODEC) 17 for encoding analog voice signals to a digital form and for decoding digital voice information to an analog form. That is, analog voice signals are digitally encoded by codec 17 for processing within digital PBX system 10. Codec 17 decodes digital voice information directed to telephone 13 by PBX 10 forming analog signals for the speaker in handset 15.

The communication path for voice signals between digital telephone 13 and a remote PBX 21 that provides analog signals to terminal equipment is from handset 15 through cord 16 to codec 17 in base unit 14 where the analog voice signals are digitally encoded for processing within PBX 10. From codec 17, the digitally encoded voice signals pass through voice path 11 of digital PBX 10 to trunk facility 22 to remote PBX 21. Trunk facility 22 can be an analog trunk facility or a PCM (pulse code modulation) digital trunk facility that carries analog voice signals, encoded PCM signals, or complex analog modem carrier signals that are PCM encoded. A codec 23 in PBX 21 converts the digitally encoded voice signals back to analog voice signals. Switch 24, which can be a separate device or part of modem 26, directs the analog voice signals to telephone 25.

The communication path for data signals between data terminal equipment (DTE) 18, such as a terminal or a PC, and DTE 27 is through cable 19 to digital telephone 13 through a digital interface 20, such as a DB-25 connector for example. DTE 18 requests a modem 12 from the PBX 10 modem pool using an appropriate protocol for PBX 10. Modem 12 converts the digital data signal output from DTE 18 into an analog modem signal for communicating with modem 26 at PBX 21 over trunk facility 22. Call processing from the user's point of view at telephone 13 is restricted to operation/format/control inherent with conventional modem pools of digital PBXs.

There are several problems with this arrangement for a digital PBX system. Depending upon the overall configuration of a particular PBX, the number of analog modems available in a modem pool may be limited. Consequently, a user may be required to wait in an inconvenient queuing arrangement before connecting with a remote DTE. Additionally, PC modem software available "off the shelf" may not provide the required dialing protocol for the PBX system so that special or custom software must be used for providing a particular dialing protocol and special setup for accessing the modem pool.

SUMMARY OF THE INVENTION

The present invention addresses these problems with conventional PBX systems by providing a device for connecting a data device having an analog output to a digital telephone having a base unit and a handset with first analog signals being coupled bi-directionally between the base unit and the handset. The present invention allows the modem pool of a conventional PBX system to be by-passed making operation of a modem similar to being connected to a private telephone line.

One embodiment of the device of the present invention includes a first input receiving the first analog signals from the base unit, a second input receiving the first analog signals from the handset, a third input receiving a second analog signal from the analog output of the data device, and a switch coupled to the first, second and third inputs for selectively bi-directionally coupling the second analog signal to the base unit and the first analog signals bi-directionally between the base unit and the handset. Preferably, the data device having the analog output is a modem or a facsimile machine.

Another embodiment of the present invention provides a digital telephone that includes a base unit, a handset with first analog signals being coupled bi-directionally between the base unit and the handset, and an adapter having a first input coupled to the base unit and receiving the first analog signals from the base unit, a second input coupled to the handset and receiving the first analog signals from the handset, a third input receiving a second analog signal from a data device external to the telephone, and a switch coupled to the first, second and third inputs for selectively bi-directionally coupling the second analog signal to the base unit and the first analog signals bi-directionally between the base unit and the handset.

Yet another embodiment of the present invention provides a digital telephone system that includes a digital private branch exchange, and at least one digital telephone connected to the digital private branch exchange. The at least one digital telephone includes a base unit and a handset with first analog signals being coupled bi-directionally between the base unit and the handset, and an adapter having a first input coupled to the base unit and receiving the first analog signals from the base unit, a second input coupled to the handset and receiving the first analog signals from the handset, a third input receiving a second analog signal from a data device external to the telephone, and a switch coupled to the first, second and third inputs for selectively bi-directionally coupling the second analog signal to the base and the first analog signals bi-directionally between the base unit and the handset.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE PREFERRED EMBODIMENT

Figure 1:
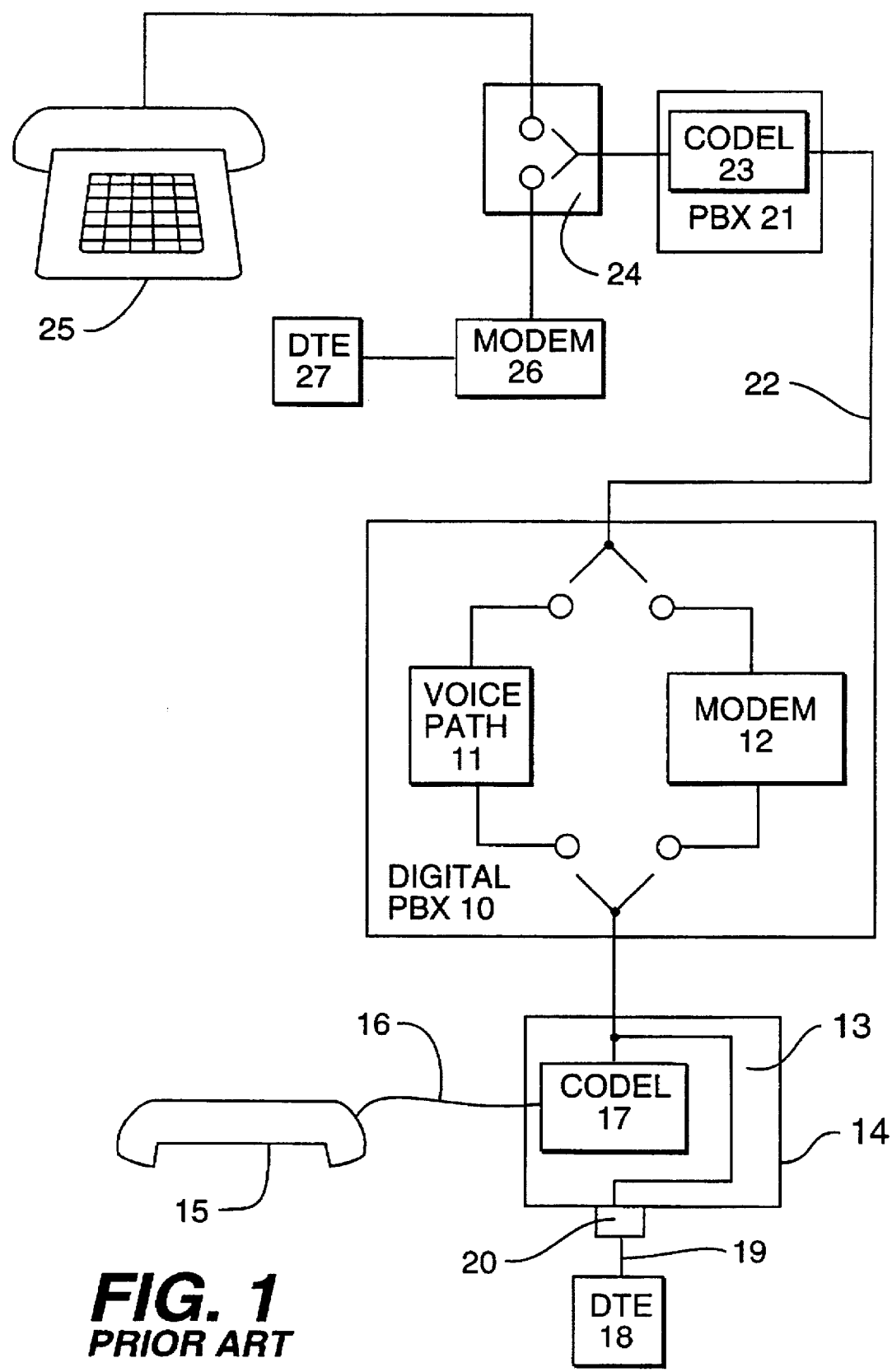
FIG. 1 shows a schematic block diagram of a conventional digital PBX system.
Figure 2:
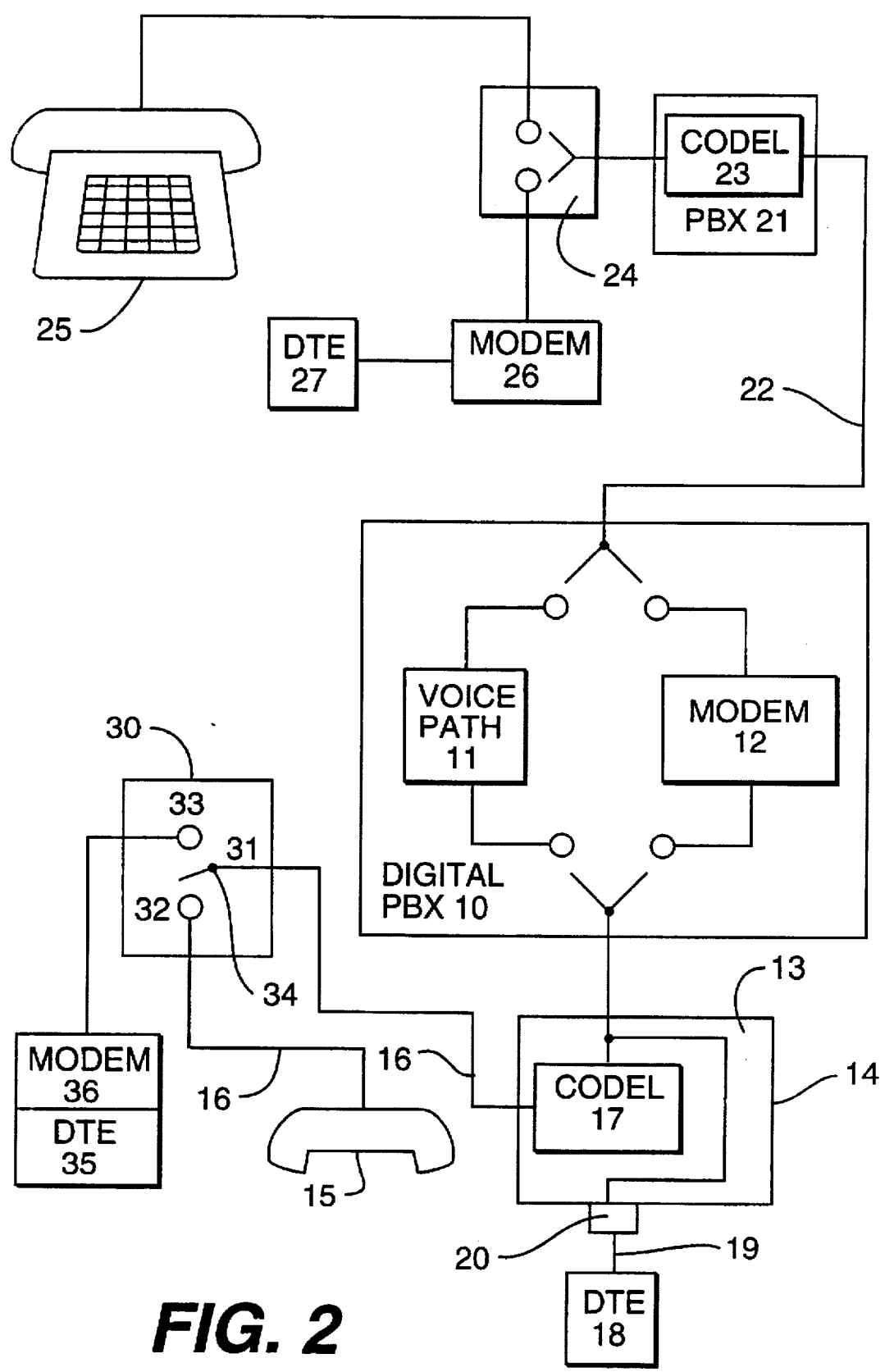
FIG. 2 shows a schematic block diagram of an adapter according to the present invention for connecting a modem to, for example, the digital PBX system of FIG. 1.

FIG. 2 shows a schematic block diagram of the conventional digital PBX system 10 of FIG. 1 in which the adapter according to the present invention for connecting a device having an analog output signal to digital PBX system is shown. Adapter 30 is connected to cord 16 between base unit 14 and handset 15 of telephone 13.

Adapter 30 has a first input 31 for accepting analog signals directed from base unit 14 to handset 15, and a second input 32 for accepting analog signals directed from handset 15 to the base unit 14. Adapter 30 includes a third input 33 for accepting analog signals from DTE 35, which can be a PC having a modem 36 or a facsimile machine, for example. When DTE 35 is a PC, modem 36 can be either an internal or external 2 or 4 wire modem having a standard analog output signal. Switch 34 is used for selectively connecting handset 15 or DTE 35 to base unit 14 for bi-directionally coupling analog signals between base unit 14 and handset 15 or base unit 14 and DTE 35.

To use adapter 30, a user lifts handset 15 and calls modem 26 at remote PBX 21. The call is directed by PBX system 10 through a voice path 11 by-passing the modem pool of PBX 10. The user listens for an auto-answer tone (2025–2225 Hz) output from modem 26 connected to DTE 27. Upon receiving the tone, the user actuates switch 34 connecting modem 36 and DTE 35 to modem 26 and DTE 27 at PBX 21. Modem 36 and modem 26 handshake in a well-known manner and a communication link between the two DTEs is made through the two modems. The two modems confer in a well-known manner setting baud rate, etc., and data is exchanged between the two DTEs.

The communication path for data signals between DTE 37 and DTE 27 is from DTE 37 to modem 36 where digital data signals are converted to an analog modem signals. From modem 36, the analog modem signals passes through adapter 30, with switch 34 connecting input 33 to input 31, to cord 16 and then to codec 17 in base unit 14. The analog modem signals are converted to digital signals by codec 17 for processing by PBX 10. The digitized analog modem signals pass through voice patent 11 to trunk facility 22 to PBX 21. Codec 23 at PBX 21 converts the digitized modem signals back to an analog form before being directed to modem 36. Modem 36 converts the data signals to digital form for processing by DTE 37.

The communication path formed by using adapter 30 by-passes the modem pool of PBX 10. Consequently, the user avoids being placed into an inconvenient queuing arrangement. Additionally, modem 36 does not require any special software for providing appropriate protocols for PBX system 10. Even though adapter 30 is indicated as a separate device, adapter 30 can easily be made part of digital telephone 13.

While the present invention has been described in connection with the illustrated embodiment, it will be appreciated and understood that modifications may be made without departing from the true spirit and scope of the invention.

What is claimed is:

1. A digital telephone system comprising:
   a digital private branch exchange;
   at least one digital telephone connected to the digital private branch exchange and having a base unit and a handset with voice signals being coupled bi-directionally between the base unit and the handset;
   a separate adapter including
   a first terminal coupled to the base unit;
   b) a second terminal coupled to the handset and passing the voice signals to and from the handset;
   c) a third terminal receiving an analog signal from a data device external to the telephone; and
   d) a user operated mechanical switch coupled to the first, second and third terminals for selectively coupling the terminals in two switching states further comprising
   a first state wherein the voice signals are coupled between the handset and the base unit; and
   a second state wherein the analog signal is coupled from the data device to the base unit.

2. The digital telephone system according to claim 1, wherein the data device is a modem.

3. The digital telephone system according to claim 1, wherein the data device is a facsimile machine.

4. The digital telephone system according to claim 1, wherein the digital private branch exchange further comprises a selectable voice path for coupling voice and analog signals between the base unit and a remote digital telephone.

* * * * *